(12) United States Patent
Huang

(10) Patent No.: US 6,315,408 B1
(45) Date of Patent: Nov. 13, 2001

(54) FOLDABLE SPECTABLE FRAME HAVING A RETRACTABLE BRIDGE AND RETRACTABLE TEMPLES

(76) Inventor: David Huang, 4F, No. 335, Sz-Yuan Rd., Shin-Chuang City, Taipei Hsien (TW)

( * ) Notice: Subject to any disclaimer, the term of this patent is extended or adjusted under 35 U.S.C. 154(b) by 0 days.

(21) Appl. No.: 09/685,726

(22) Filed: Oct. 11, 2000

(51) Int. Cl.[7] ....................................... G02C 5/04
(52) U.S. Cl. ............................. 351/128; 351/118; 351/63
(58) Field of Search ............................... 351/63, 118, 128

(56) References Cited

U.S. PATENT DOCUMENTS

| 4,820,035 | 4/1989 | Kanda | 351/153 |
|---|---|---|---|
| 5,896,185 | 4/1999 | Huang | 351/63 |
| 5,929,966 * | 7/1999 | Conner | 351/118 |
| 6,017,119 * | 1/2000 | Huang | 351/63 |

* cited by examiner

*Primary Examiner*—Huy Mai
(74) *Attorney, Agent, or Firm*—Ladas and Parry (57) ABSTRACT

Disclosed is a foldable spectacle frame, comprising: two lens frames each having an inner end and an outer end, a retractable bridge connecting the two lens frames in an opposed relation at the inner ends thereof, in which the retractable bridge having an adjustable length which is able to be frictionally retained between a smallest folded position and a largest normal position; and two retractable temples hinged to the lens frames at the outer ends thereof, each of the retractable temples having an adjustable length which is able to be adjusted between a smallest folded position and a largest normal position.

11 Claims, 8 Drawing Sheets

FOLDABLE SPECTABLE FRAME HAVING A RETRACTABLE BRIDGE AND RETRACTABLE TEMPLES

FIELD OF INVENTION

The present invention relates to improvements in foldable spectacle frames.

BACKGROUND OF INVENTION

There exist various foldable spectacles, which can be received within containers, such as glasses bags, for easy carriage as that disclosed in ROC (Taiwan) Patent Publication No. 282840, and U.S. Pat. No. 5,896,185.

It is disclosed U.S. Pat. No. 4,820,035 another type of spectacle frame comprising lens frames and temples, wherein the temples are foldable to a thin form in substantially a same plane as the lens frames without lapping over the lens frames.

The present invention provides a spectacle frame, in a combination, including a retractable bridge that connects a pair of frames and a pair of retractable temples, such that after folding, the spectacle frame is stored in a rigid, thin, rectangular shape container.

BRIEF DESCRIPTION OF INVENTION

An object of this invention is to provide a spectacle frame that includes a retractable bridge that connects a pair of frames so as to reduce its size in folding.

Another object of this invention is to provide a spectacle frame that includes a pair of retractable temples of stable constructions.

A further object of the present invention is to provide a rigid, thin, rectangular container for such foldable spectacle frame thereby preventing the spectacle frame from and increasing the protection thereof against accidental occurrences of squeezes and damages.

The structure and features of the present invention can be readily realized by those skilled in the art with reference to the description of the preferred embodiment accompanied with the drawings.

DESCRIPTION OF PREFERRED EMBODIMENT

The present invention will be described below in detail with reference to the embodiments shown in the drawings.

For the ease of explaining the structural design of this invention, the horizontal plane to which the specification refers, refers to the plane on which the temples are rested on after being expanded.

Figure 1:
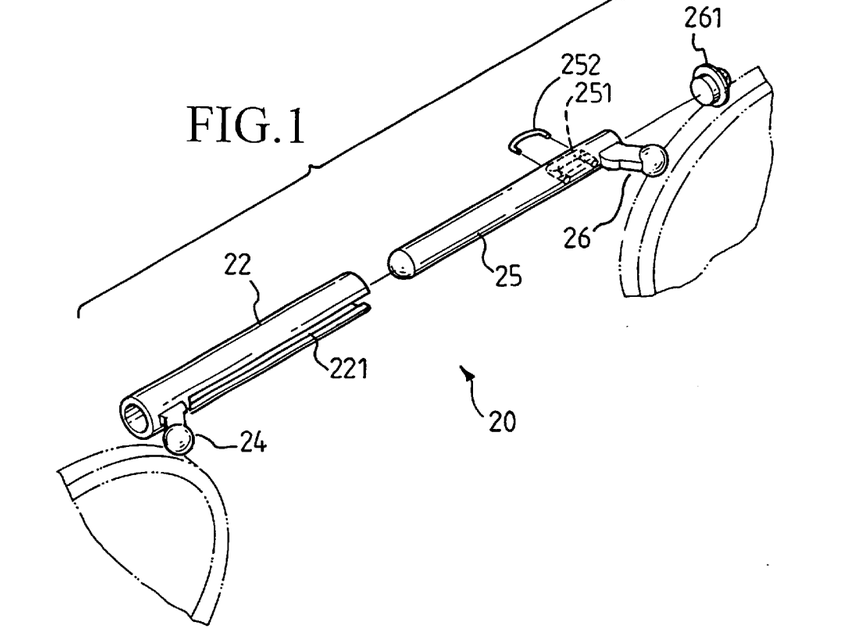
FIG. 1 is an enlarged perspective view of an embodiment of a retractable bridge of the present invention.

With reference to FIG. 1, an enlarged perspective view of an embodiment of a retractable bridge 20 of the present invention is illustrated. The bridge 20 connects two opposing frames 12 (FIG. 4) each having an inner end and an outer end.

The retractable bridge 20 has an adjustable length, which can be frictionally retained between a smallest folded position and a largest normal position.

In this particular embodiment, the bridge 20 includes a bridge piece 22, a fixed connecting piece 24, and a sliding piece 25. The bridge piece 22 includes a first end and a second end and is substantially formed in to a laterally oriented U-shaped configuration so as to form a guiding slit 221 along a body portion of the bridge piece 22.

The fixed connecting piece 24 includes a connecting portion connecting between the inner end of one of the lens frame 12 and the first end of the bridge piece 22.

The sliding piece 25 has a first end and a second end; the first end is provided with a moving connecting piece 26 connecting to the inner end of the other lens frame 12. The sliding piece 25 is adapted to be sliding in the bridge piece 22 by inserting the second end of the sliding piece 25 from the second end of the bridge piece 22 with the moving connecting piece 26 traveling along the guiding slit 221.

A retaining means is provided for slidably retaining the sliding piece 25 within the bridge piece 22, the retaining means includes an end cap 261 being inserted into the second end of the bridge piece 22 while the first end of the sliding piece 25 is inserted through the second end of the bridge piece 22, a recess 251 formed on the sliding piece 25 and adjacent the moving connecting piece 26, and a spring member 252 received in the recess 251.

Figure 2:
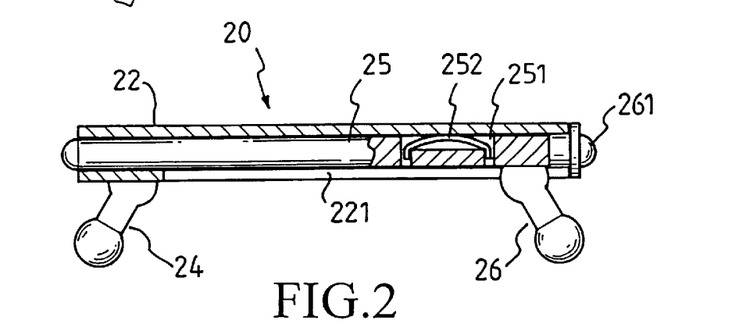
FIG. 2 is an enlarged, cross-sectional view of the embodiment in FIG. 1 in its expanded state.
Figure 3:
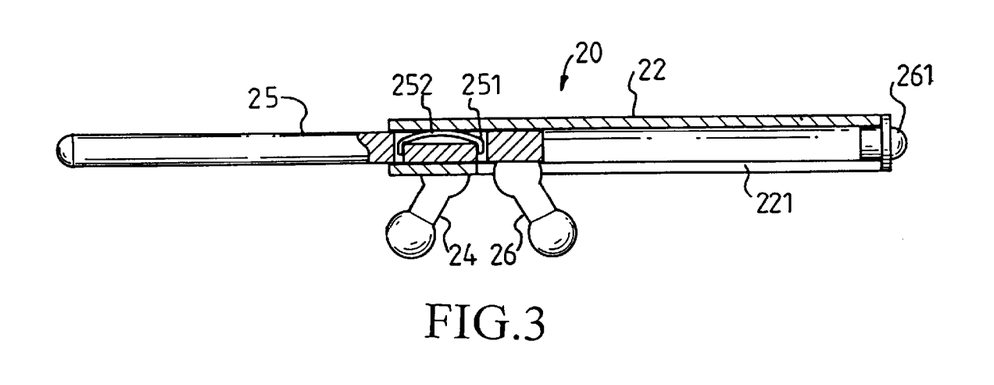
FIG. 3 is an enlarged, cross-sectional view of the embodiment in FIG. 1 in its retracted state.

After the sliding piece 25 is inserted into the guiding slit 221 through the second end of the bridge piece 22, the end cap 261 is inserted to the second end of the bridge piece 22 such that the moving connecting piece 26 is retractable towards and away from the fixed connecting piece 24 along the guiding slit 221 for retracting or expanding the bridge 20. Frictional contact between the spring member 252 and an inner wall of the connecting piece 22 allows adjustment of the retracted or expanded distance. When spaced apart by the smaller distance, the lens frames are positioned in place for storage, as shown in FIG. 3; when spaced apart by the largest distance, the lens frames 12 are positioned in place for the respective pupils of the wearer, as shown in FIG. 2.

Figure 4:
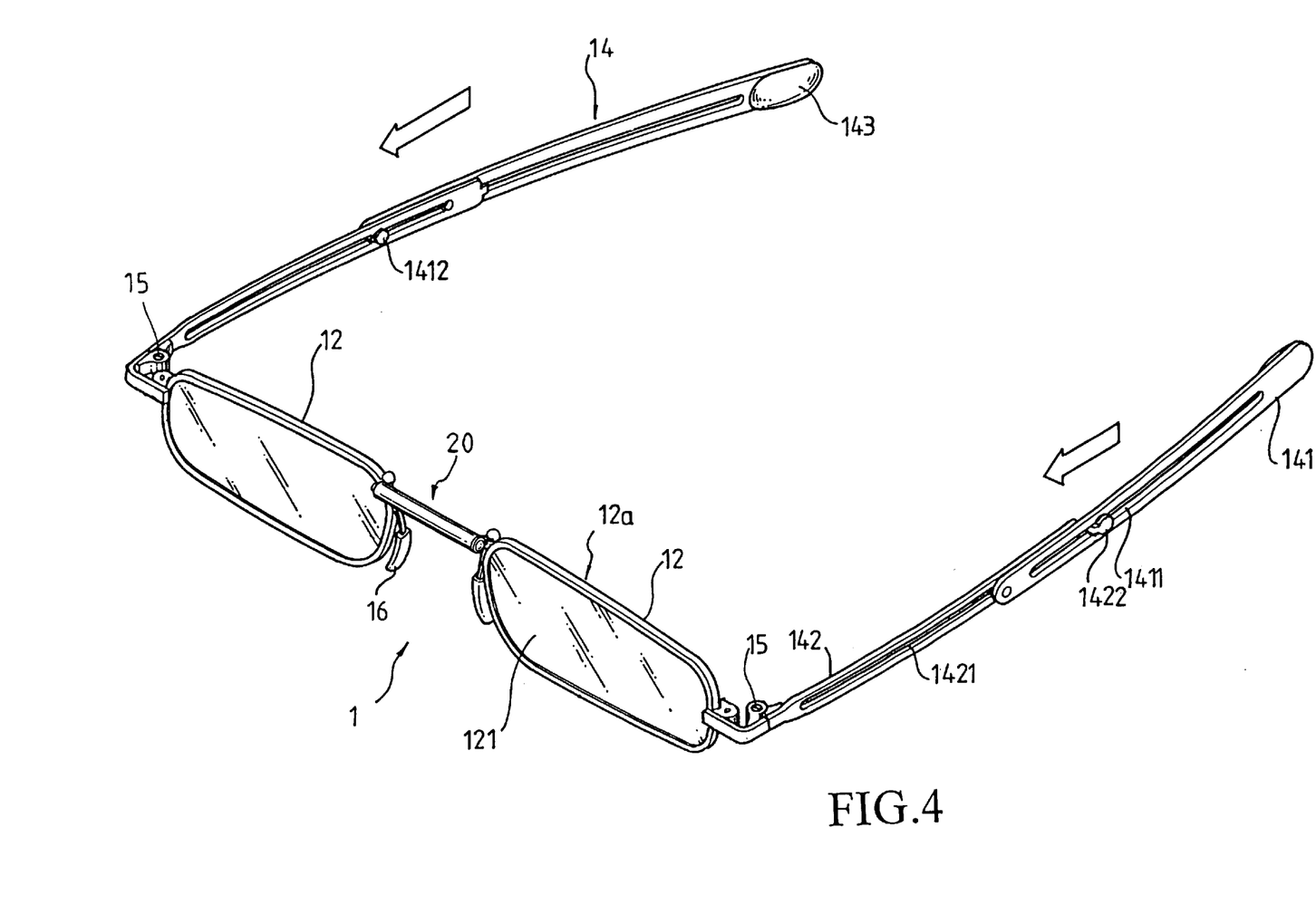
FIG. 4 is a perspective view of a pair of foldable spectacle from of the present invention with retractable temples under their expanded state.

FIG. 4 illustrates an embodiment of a pair of foldable spectacle frame 1 according to this invention under an expanded state. The spectacle frame 1 comprises two frames 12, two hinge devices 15, two temples 14, a retractable bridge 20 of FIGS. 1–3, and two nose pad devices 16, wherein the two frames 12 are provided for retaining two lenses 121 therein and the two hinge devices 15 integrally formed or secured to the outer sides thereof have pivotal axes normal to the horizontal plane.

The retractable temples 14 as illustrated in FIG. 4 enable the spectacle frame 1 to be folded into a smaller volume. The temples 14 illustrated in FIG. 4 each comprise a retractable temple member 141 and a stationary temple member 142. The temples members 141, 142 are each formed with a first sliding slot 1411 and a second sliding slot 1421 between opposite ends thereof. One end of the retractable temple member 141 is provided with a connecting device 1412 for clinching into the second sliding slot 1421 of the stationary temple member 142. The stationary temple member 142 has a free end being provided with another connecting device 1422 for clinching into the first sliding slot 1411 of the retractable temple member 142 such that the retractable temple member 142 can be frictionally and slidably positioned within the second sliding slot 1421 of the stationary temple member 142.

In the embodiment illustrated in FIG. 4, the connecting devices 1412, 1422 are, respectively, a template catch button and a bolted screw.

According to an embodiment of the present invention, a temple pad 143 is attached to an inner side of the end of the retractable temple member 141 so as to enhance comfort while wearing.

Figure 5:
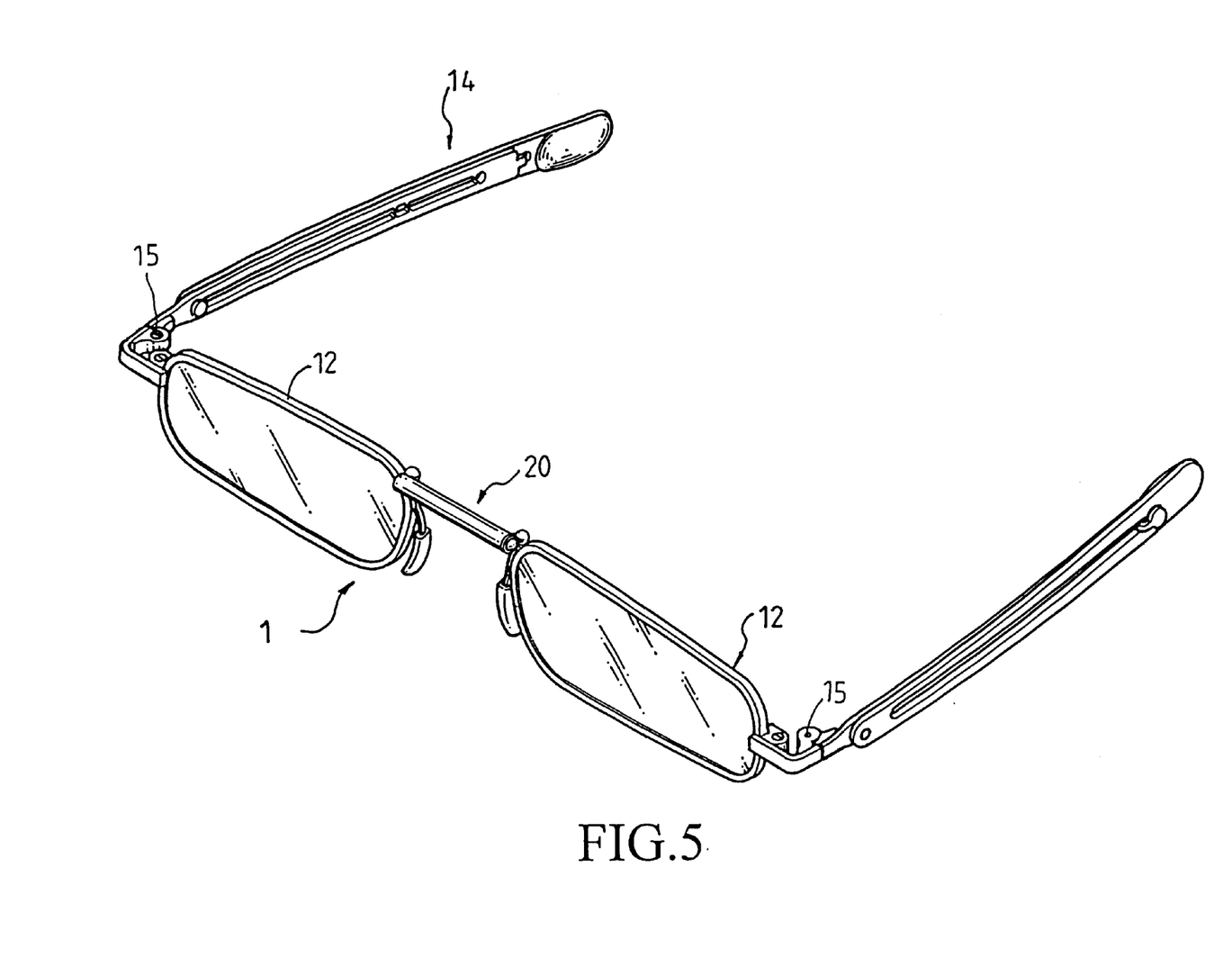
FIG. 5 is a perspective view illustrating the foldable spectacle frame of FIG. 4 with retractable temples under their retracted state
Figure 11:
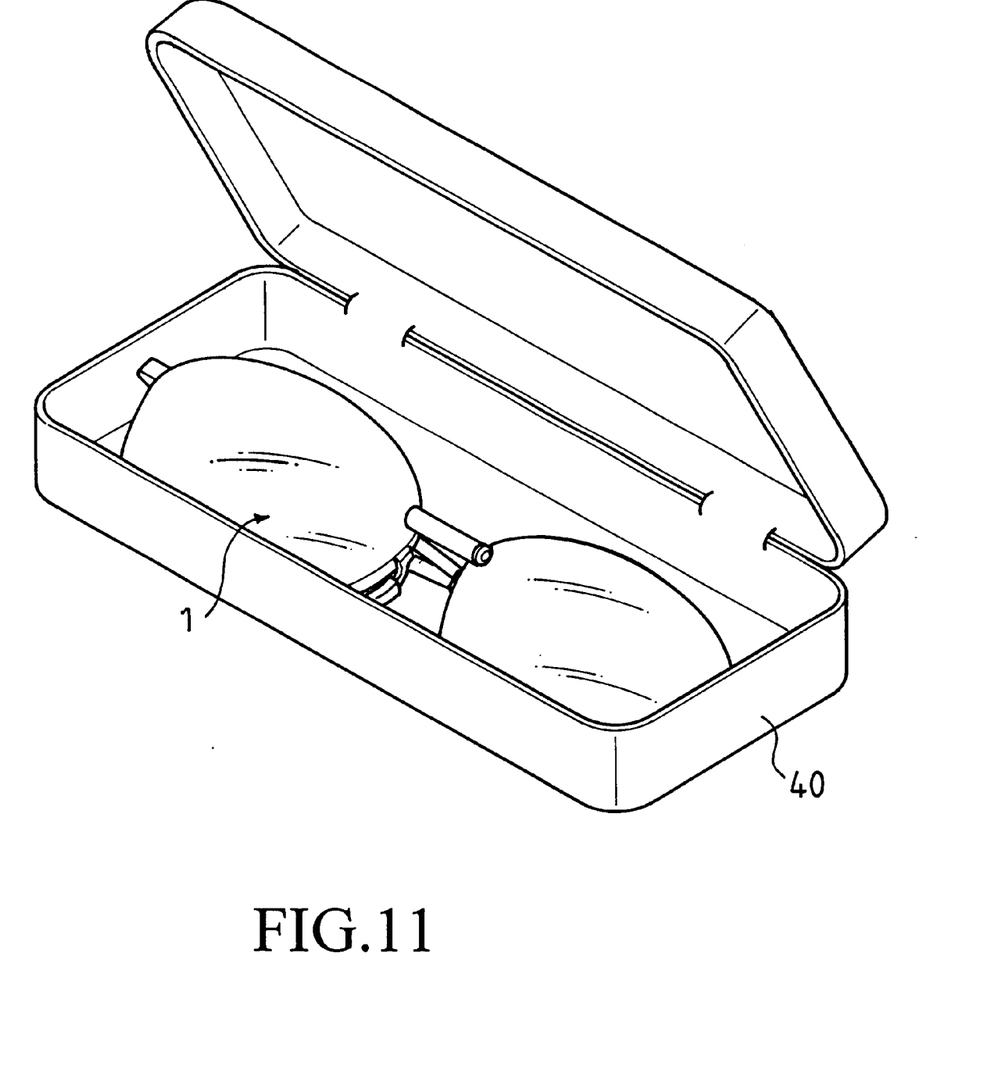
FIG. 11 is a perspective showing a spectacle frame of this invention being stored in a thin, rectangular shaped container.

To receive the foldable spectacle frame 1 of FIG. 4, the connecting devices 1412 of the retractable temples 14 are each firstly slid along the second sliding slot 1421 of the stationary member 142. The two frames 12 are then moved towards each other by means of the retractable bridge 20. Finally, the retracted temples 14 are inwardly folded about the pivotal axes of the hinge devices 15 provided the outer sides of the frames 12 toward the frames 12. The spectacle frame 1 are thus folded into a substantially thin, and rectangular configuration and can then be received into a rigid, rectangular container 40, as shown in FIG. 11. The completely folded spectacle is substantially flat and thin in size so as to be conveniently carried by a user.

Figure 6:
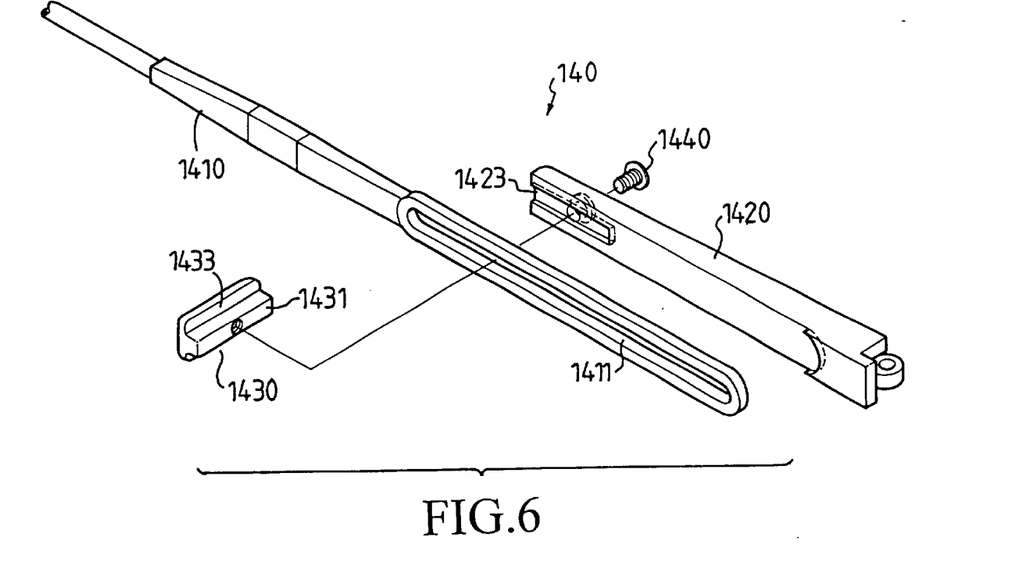
FIG. 6 is an enlarged, exploded view showing another embodiment of the retractable temple of the present invention.
Figure 7:
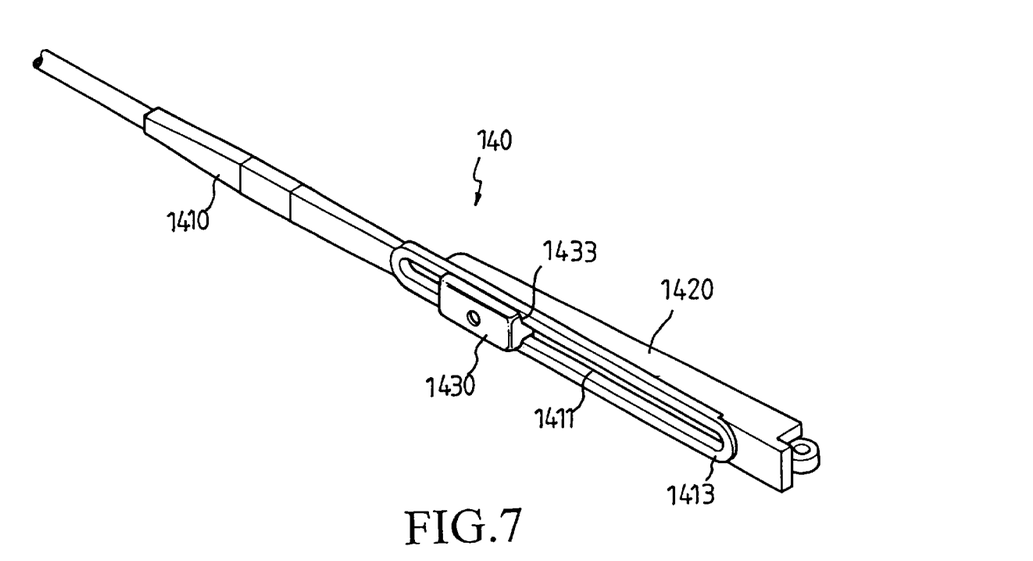
FIG. 7 is an enlarged, assembled view showing the embodiment of FIG. 6.
Figure 8:
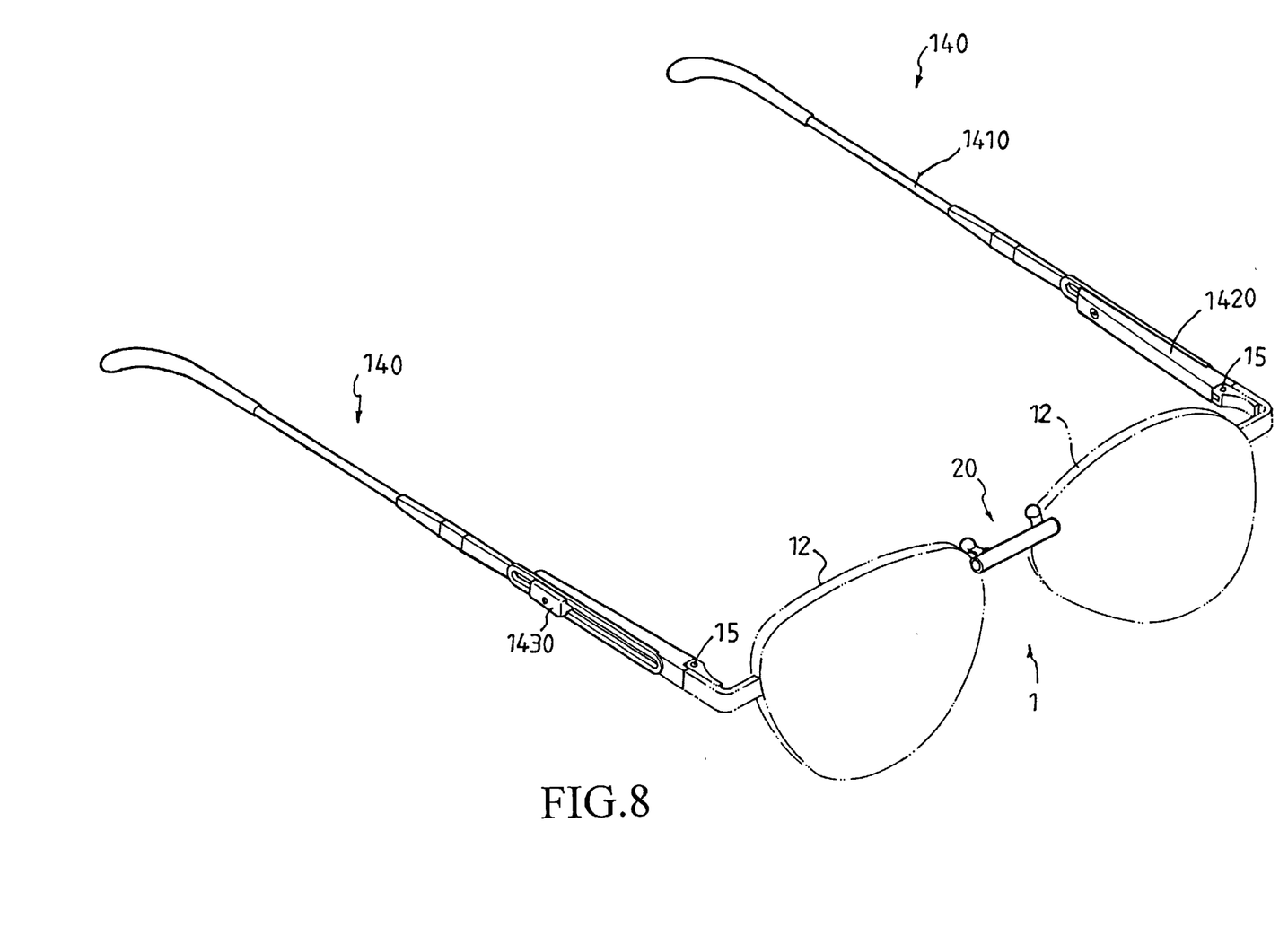
FIG. 8 is a perspective view showing a foldable spectacle of this invention with the retractable temples of FIGS. 6 and 7.

FIG. 6 is an enlarged, exploded view showing another embodiment of the retractable temple of the present invention; FIG. 7 is an enlarged, assembled view showing the embodiment of FIG. 6; and FIG. 8 is a perspective view showing a foldable spectacle of this invention with the retractable temples of FIGS. 6 and 7.

As shown in FIG. 6, the retractable temple 140 comprises a retractable temple member 1410, a stationary temple member 1420, and a retaining block 1430.

The stationary temple member 1420 is hinged to the outer end of each of the lens frames 12. The retractable temple member 1410 includes a front section and a rear section, wherein the front section is formed with a sliding slot 1411.

The retaining block 1430 connects the front section of the retractable temple member 1410 to the stationary temple member 1420 by inserting and retaining the retaining block 1430 within the sliding slot 1411 to the stationary temple member 1420 so as to enable the retaining block 1430 to relatively move along the sliding slot 1411.

In this embodiment, the retaining block 1430 is formed of a substantially T-shaped cross-section with a projecting bottom 1431. The projecting bottom 1431 passes through the sliding slot 1411 to be secured to an indent 1423 at a free end of the stationary temple member 1420 by means of a bolt 1440 so as to form a pair of rails 1433 in cooperation with the stationery temple 1420. The rails 1433 receive the temple ring 1413 for guiding retraction and expansion of the retractable temple 1410.

As such, the retractable temple 1410 can be retracted and expanded along the rails 1433 in a stable manner, where a larger length the retaining block 1430 results in a more stable construction.

Figure 9:
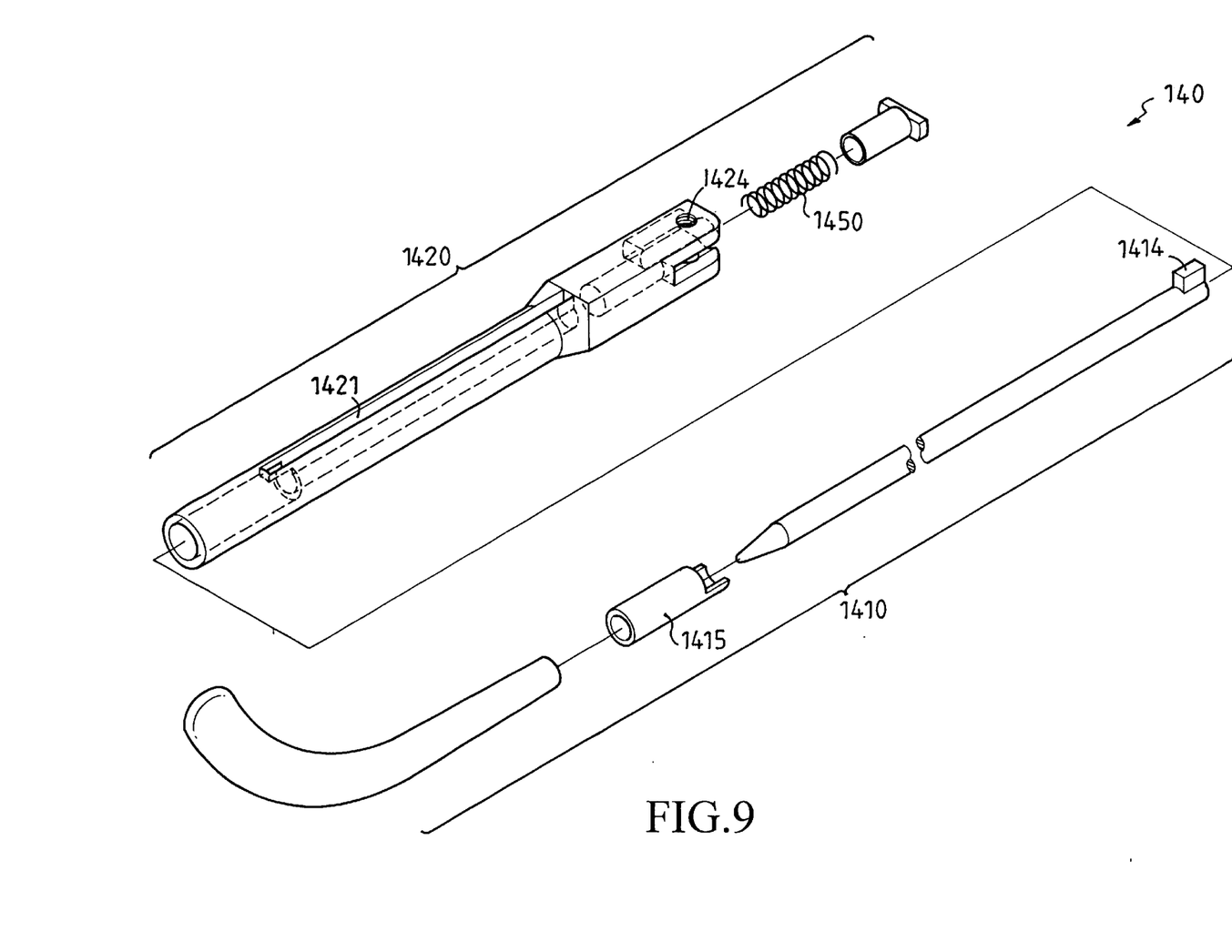
FIG. 9 is an enlarged, exploded view showing another embodiment of the retractable temple of the present invention.
Figure 10:
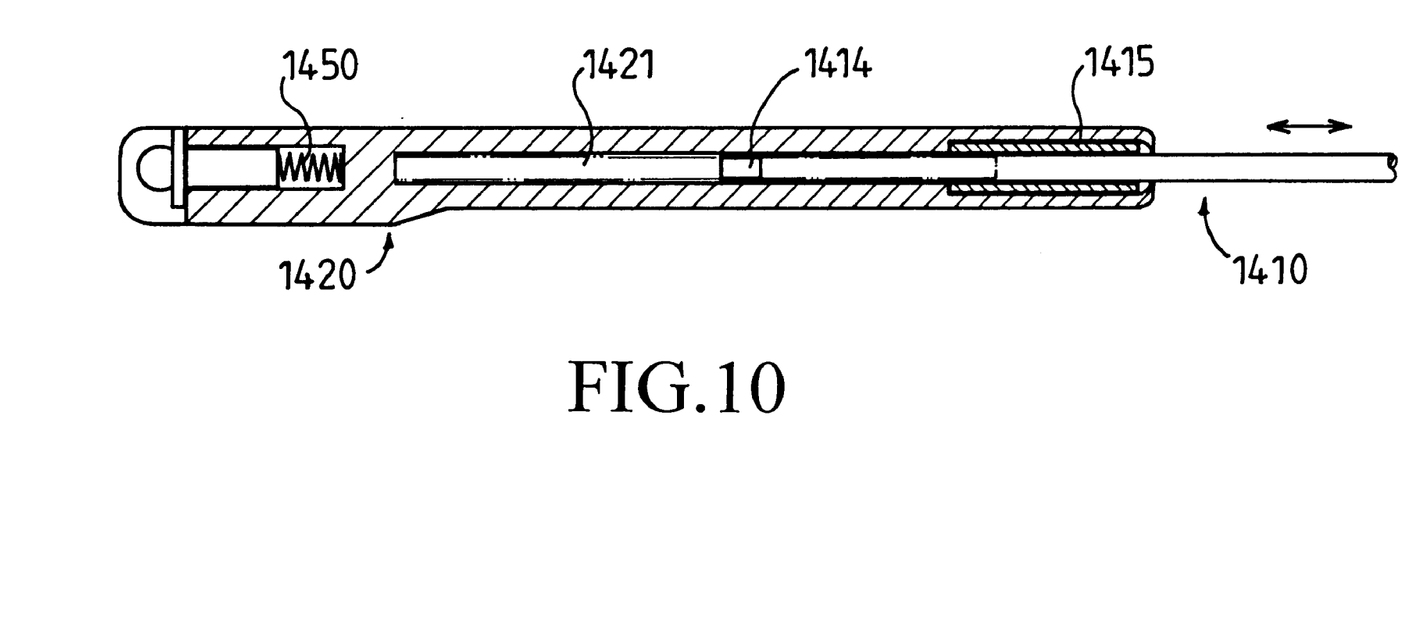
FIG. 10 is a cross-sectional view showing the assembled view of the retractable temple of FIGS. 9.

FIG. 9 is an enlarged, exploded view showing another embodiment of the retractable temple of the present invention; FIG. 10 is a cross-sectional view showing the assembled view of the retractable temple of FIGS. 9.

As shown in FIG. 9, the retractable temple 140 comprises a retractable temple member 1410 and a stationary temple member 1420.

The stationary temple member 1420 has a first end and a second end, wherein the first end is hinged to the outer end of each of the lens frames 12 through a threaded hole 1424. The stationary temple member 1420 is a tubular body formed with a longitudinal sliding slot 1421.

The retractable temple member 1410 has a first end and a second end, and includes a retaining piece 1414 projects radially outwards from the first end of the retractable temple member 1410.

The retaining piece 1414 connects the retractable temple member 1410 to the stationary temple member 1410 by inserting the first end of the retractable temple member 1410 into the second end of the stationary temple member 1410 and retaining the retaining piece 1414 through the sliding slot 1421 so as to enable the retaining piece 1430 to relatively move along the sliding slot 1411.

After the first end is inserted through the second end of the stationary temple member 1420, the second end of the stationary temple member 1420 is deformed to prevent disengagement of the retractable temple member 1410 from the stationary temple member 1420. A further bushing 1415 may be provided between the retractable temple member 1410 and the stationary temple member 1420 so as to enhance frictional force between the two members.

In this embodiment, a spring mean 1450 is retrained within the first end of the stationary temple member 1420 such that the temple 140 may be easily folded while the user applies minute force.

As such, the retractable temple 1410 can be retracted and expanded along the sliding slot 1421, where the tubular configuration of the stationary temple member 1420 results in a more stable construction.

By combining the retractable bridge, the retractable temples, and a thin, rectangular shaped container, a combination of foldable spectacle frame and thin, rectangular container is formed to allow convenient carriage by a user.

Aforementioned explanation is directed to the description of the preferred embodiment according to the present invention. Various changes and implementations can be made by those skilled in the art without departing from the technical concept of the present invention. Since the present invention is not limited to the specific details described in connection with the preferred embodiment except those that may be within the scope of the appended claims, changes to certain features of the preferred embodiment without altering the overall basic function of the invention are contemplated.

What is claimed is:

1. A foldable spectacle frame, comprising:
   two lens frames each having an inner end and an outer end;
   a retractable bridge connecting the two lens frames in an opposed relation at the inner ends thereof, in which the retractable bridge having an adjustable length which is able to be frictionally retained between a smallest folded position and a largest normal position; and two retractable temples hinged to the lens frames at the outer ends thereof, each of the retractable temples having an adjustable length which is able to be adjusted between smallest folded position and a largest normal position, wherein the retractable bridge comprises:

a bridge piece configured to a tubular shape which has a tubular wall, a first end and a second end, the bridge piece being substantially provided with a laterally oriented U-shaped guiding slit formed along the tubular wall with an opening formed on the second end of the bridge piece;

a fixed connecting piece connecting between the inner end of one of the lens frames and the first end of bridge piece;

a sliding piece having a first end and a second end of which the first end is provided with a moving connecting piece which connects to the inner end of the other lens frame, the sliding piece adapted to be sliding in the bridge piece by inserting the second end of the sliding piece from the second end of the bridge piece with the moving connecting piece traveling along the guiding slit; and a retaining means provided on the bridge piece to frictionally retaining the sliding piece within the bridge piece.

2. The foldable spectacle frame according to claim 1, wherein the retaining means includes an end cap being inserted at the second end of the bridge piece while the first end of the sliding piece is inserted through the second end of the bridge piece, a recess formed on the sliding piece adjacent the moving connecting piece, and a spring member received in the recess.

3. The foldable spectacle frame according to claim 1, wherein each of the temples includes:

a stationary temple member having a first end, a second end and a first sliding slot formed between the first and second ends thereof, the first end being pivotally connected to the outer end of each of the lens frames;

a retractable temple member having a first end, a second end and a second sliding slot being formed between the first and second ends thereof;

a first connecting device connecting the second end of the stationary temple member to slide along the second sliding slot; and a second connecting device connecting the first end of the retractable temple member slide along the first sliding slot.

4. The foldable spectacle frame according to claim 1, wherein each of the temples includes:

a retractable temple member having a front section and a rear section, in which the front section is formed with a sliding slot;

a stationary temple member with an end thereof being hinged to the outer end of each of the lens frames;

a retaining block connecting the front section of the retractable temple member to the stationary temple member by inserting and retaining the retaining block through the sliding slot to the stationary temple member to enable the retaining block relatively to move along the sliding slot.

5. The foldable spectacle frame according to claim 1, wherein each of the temples includes:

a stationary temple member of a tubular body formed with a sliding slot and having a first end and a second end, wherein the first end is hinged to the outer end of each of the lens frames;

a retractable temple member having a first end and a second end; and a retaining piece projecting radially outwards from the first end of the retractable temple member, the retaining piece connecting the retractable temple member to the stationary temple member by inserting the first end of the retractable temple member into the second end of the stationary temple member and retaining the retaining piece within the sliding slot so as to enable the retaining piece to relatively move along the sliding slot;

wherein the second end of the stationary temple member is deformed to prevent disengagement of the retractable temple member from the stationary temple member after the first end of the retractable temple member is inserted through the second end of the stationary temple member.

6. A foldable spectacle frame pack, comprising a container for receiving the foldable spectacle frame according to claim 1, wherein the spectacle frame is under a folded situation with the retractable bridge being retracted to the smallest folded position and the each of the retractable temples is adjusted to the smaller position.

7. In a combination of a foldable spectacle frame and a thin container, wherein the foldable spectacle frame comprises:

two lens frames each having an inner end and an outer end;

a retractable bridge connecting the two lens frames in an opposed relation at the inner ends thereof, in which the retractable bridge having an adjustable length which is able to be frictionally retained between a smallest folded position and a largest normal position; and two retractable temples hinged to the lens frames at the outer ends thereof, each of the retractable temples having an adjustable length which is able to be adjusted between a smallest folded position and a largest normal position;

thereby when the spectacle frame is under a folded form with the retractable bridge being retracted to the smallest folded position and each of the retractable temples is adjusted to the smaller position, the folded spectacle frame is adapted to be stored within the container, wherein the retractable bridge comprises:

a bridge piece configured to a tubular shape which has a tubular wall, a first end and a second end, the bridge piece being substantially provided with a laterally oriented U-shaped guiding slit formed along the tubular wall with an opening formed on the second end of the bridge piece;

a fixed connecting piece connecting between the inner end of one of the lens frames and the first end of bridge piece;

a sliding piece having a first end and a second end of which the first end is provided with a moving connecting piece which connects to the inner end of the other lens frame, the sliding piece adapted to be sliding in the bridge piece by inserting the second end of the sliding piece from the second end of the bridge piece with the moving connecting piece traveling along the guiding slit; and a retaining means provided on the bridge piece to frictionally retaining the sliding piece within the bridge piece.

8. In the combination of a foldable spectacle frame and a thin container according to claim 7, wherein the retaining means includes an end cap being inserted at the second end of the bridge piece while the first end of the sliding piece is inserted through the second end of the bridge piece, a recess formed on the sliding piece adjacent the moving connecting piece, and a spring member received in the recess.

9. In the combination of a foldable spectacle frame and a thin, rectangular container according to claim 7,
- a stationary temple member having a first end, a second end and a first sliding slot formed between the first and second ends thereof, the first end being pivotally connected to the outer end of each of the lens frames;
- a retractable temple member having a first end, a second end and a second sliding slot being formed between the first and second ends thereof;
- a first connecting device connecting the second end of the stationary temple member to slide along the second sliding slot; and
- a second connecting device connecting the first end of the retractable temple member slide along the first sliding slot.

10. In the combination of a foldable spectacle frame and a thin container according to claim 7, wherein each of the temples includes:
- a retractable temple member having a front section and a rear section, in which the front section is formed with a sliding slot;
- a stationary temple member with an end thereof being hinged to the outer end of each of the lens frames;
- a retaining block connecting the front section of the retractable temple member to the stationary temple member by inserting and retaining the retaining block through the sliding slot to the stationary temple member.

11. In the combination of a foldable spectacle frame and a thin container according to claim 7, wherein each of the temples includes:
- a stationary temple member of a tubular body formed with a sliding slot and having a first end and a second end, wherein the first end is hinged to the outer end of each of the lens frames;
- a retractable temple member having a first end and a second end; and
- a retaining piece projecting radially outwards from the first end of the retractable temple member, the retaining piece connecting the retractable temple member to the stationary temple member by inserting the first end of the retractable temple member into the second end of the stationary temple member and retaining the retaining piece within the sliding slot so as to enable the retaining piece to relatively move along the sliding slot;
- wherein the second end of the stationary temple member is deformed to prevent disengagement of the retractable temple member from the stationary temple member after the first end of the retractable temple member is inserted through the second end of the stationary temple member.

* * * * *

UNITED STATES PATENT AND TRADEMARK OFFICE
CERTIFICATE OF CORRECTION

PATENT NO. : 6,315,408 B1
DATED : November 13, 2001
INVENTOR(S) : David Huang

It is certified that error appears in the above-identified patent and that said Letters Patent is hereby corrected as shown below:

<u>Title page,</u>
Item [54], "SPECTABLE" should read -- SPECTACLE --.

Signed and Sealed this

Nineteenth Day of March, 2002

Attest:

JAMES E. ROGAN
*Attesting Officer*  *Director of the United States Patent and Trademark Office*